US006667437B2

United States Patent
Schenk (10) Patent No.: US 6,667,437 B2
(45) Date of Patent: Dec. 23, 2003

(54) PEDESTAL FOR OUTDOOR CIRCUITS

(76) Inventor: Kenneth W. Schenk, 6319 Northwest Hwy., Chicago, IL (US) 60631

(*) Notice: Subject to any disclaimer, the term of this patent is extended or adjusted under 35 U.S.C. 154(b) by 0 days.

(21) Appl. No.: 10/139,872

(22) Filed: May 7, 2002

(65) Prior Publication Data

US 2003/0209356 A1 Nov. 13, 2003

(51) Int. Cl.[7] .................................. H02G 9/00
(52) U.S. Cl. ........................ 174/38; 174/39; 52/3
(58) Field of Search ............................ 174/38, 37, 39, 174/17 R, 17 CT, 58, 59, 60; 220/3.3; 361/364; 52/3

(56) References Cited

U.S. PATENT DOCUMENTS 3,164,668 A * 1/1965 Skubal ..................... 174/38 X
6,198,041 B1 * 3/2001 Leschinger et al. ........... 174/38
6,316,722 B1 * 11/2001 Low et al. ..................... 174/38

* cited by examiner

Primary Examiner—Dean A. Reichard
Assistant Examiner—Dhiru R Patel
(74) Attorney, Agent, or Firm—Dillis V. Allen, Esq.

(57) ABSTRACT

A pedestal for outdoor circuits including a vertically elongated rectangular housing having a substantial lower portion thereof mounted below grade and an integral upper portion projecting above grade. The lower portion has a lower opening for receiving conduits, cables or conductors without restriction. The upper portion has a rectangular opening for receiving selectively single or double gauged NEMA devices such as receptacles, switches, lights, etc. The area around the opening is drilled and tapped to standard NEMA specifications to easily mount the NEMA devices as well as cover plates, bezels and pivot cap covers. A long removable access cover panel fits under a peripheral rain deflector rib. This cover provides access to the wiring and to fasteners that mount the housing to a fixed abutment.

12 Claims, 6 Drawing Sheets

PEDESTAL FOR OUTDOOR CIRCUITS

BACKGROUND OF THE INVENTION

Pedestal terminals have been used for the last several decades to provide terminals for public utility service such as electric power supply and telecommunication systems. These pedestals are generally rectangular in cross section, although some are circular, and are mounted partly below grade and partly above grade. As the public will appreciate from seeing these pedestal terminals at various angular orientations across the landscape, it comes at no surprise that there is a difficulty in securing these pedestal terminals in a proper upright or vertical position because of poor backfilling after installation and/or freezing and ground heeving conditions. One advantage in these earth mounted terminals is that in some cases, depending upon the pedestal design, movement of the entering or exiting cables, conduits, and wiring, etc. at the bottom of these pedestals is fairly unrestricted in some cases and in part ameliorates the problem of conductor shifting relative to the pedestal itself.

Insofar as I am aware, however, the pedestal design has not been significantly incorporated into the commercial and residential outdoor circuit requirements market. One such residential pedestal called a "Guard-End Post" manufactured by Arlington of Scranton, Pa., is a plastic injection molded hollow post designed to supply power to a light fixture and other devices requiring electrical wiring and attempts to provide grounding on a ½ inch threaded pipe.

However, this particular design is only 19½ inches in total height and projects beneath the soil only a few inches with an angular spike element. Thus, this Arlington design does not, in my opinion, provide the required stability, safety, and weatherproofness necessary for outdoor circuitry in the residential and commercial markets.

The following patents have been identified in a search of the present invention:

UNITED STATES PATENTS

| Inventor | Patent No. | Issue Date |
| --- | --- | --- |
| Sargent | 1,986,122 | Jan. 1, 1935 |
| Skubal | 3,164,668 | Jan. 5, 1965 |
| Simon | 3,188,379 | June 8, 1965 |
| Phillips | 3,375,620 | Apr. 2, 1968 |
| Mack, et al. | 3,404,212 | Oct. 1, 1968 |
| Bunten | 3,740,452 | June 19, 1973 |
| Volk, et al. | 5,384,427 | Jan. 24, 1995 |
| Chandler | 5,611,616 | Mar. 18, 1997 |
| Marusinec | 5,783,775 | Jul. 21, 1998 |

The Sargent, U.S. Pat. No. 1,986,122, shows a partition riser for interior use relating to underfloor wiring systems for establishing outlets in the partitions or walls of buildings. This riser includes a rectangular opening 27 for receptacles.

The Skubal, U.S. Pat. No. 3,164,668, shows a terminal pedestal for buried wiring systems in which a rectangular pedestal with a spike 7 extends a substantial distance below grade. This system is a terminal only system and thus merely connects incoming and outgoing wiring, ingressing and egressing at the base of the pedestal and is typical of the public utility type pedestals referred to above.

The Simon, U.S. Pat. No. 3,188,379, shows a weatherproof electrical installation pedestal for receptacles that utilize direct burial trench cable, which is buried at a depth at which the ground will freeze during the winter and occasionally result in a cable being pulled away from the devices which may be outlets such as lights and the like, as in the present invention. The Simon invention relates primarily to a pivoting hood and requires an elongated base 46 at the bottom of the pedestal that is difficult to install because of its large diameter. The side panel 23 also requires customization for the particular type of receptacle utilized.

The Phillips, U.S. Pat. No. 3,375,620, shows a terminal pedestal for underground wiring systems including an upwardly extending lamp 12 that has U-shaped clamps for holding the device on a buried tube 12.

The Mack, et al., U.S. Pat. No. 3,404,212, shows a terminal device for wire or cable facilities, particularly designed for public utilities, and it has a box-like structure mounted on a separate support post 28 with a pivoting axis panel as shown at 110. The Mack, et al. device is similar to the Skubal device above simply limited to a public utility terminal function, although Mack, et al. discuss the problem of ground heeving in the patent.

The Bunten, U.S. Pat. No. 3,740,452, assigned to Repco Products Corporation, shows a pedestal for electrical circuit components that are unshown in the drawings of the patent and includes a pivoting axis panel D that fits under a cap 51.

The Volk, et al., U.S. Pat. No. 5,384,427, shows a multiple sleeved flood protection pedestal for telecommunications equipment that appears conventional in configuration.

The Chandler, U.S. Pat. No. 5,611,616, shows an electrical controls enclosure that is circular in configuration and has an exterior mounted above-ground base 42.

The Marusinec, U.S. Pat. No. 5,783,775, shows a transformer door with a corrosion resistant bottom strip that also is adapted to be mounted above grade.

It is a primary object of the present invention to ameliorate the problems described above in pedestals adapted for outdoor circuits.

SUMMARY OF THE PRESENT INVENTION

In accordance with the present invention, a pedestal is provided for outdoor electrical circuits including a vertically elongated rectangular housing having a substantial lower portion thereof mounted below grade and an integral upper portion projecting above grade. The lower portion has a lower opening for receiving conduits, cables or conductors without restriction. The upper portion has a rectangular opening for receiving selectively single or double gauged NEMA devices such as receptacles, switches, lights, etc. The area around the opening is drilled and tapped to standard NEMA specifications to easily mount the NEMA devices as well as cover plates, bezels and pivot cap covers. A long removable access cover panel fits under a peripheral rain deflector rib. This cover provides access to the wiring and to fasteners that mount the housing to a fixed abutment.

Furthermore, according to one embodiment of the present invention, the pedestal is provided with a vertical divider, generally centrally in the pedestal interior, that divides the interior into a telecommunications section and an electric supply section. One-half of the opening in the upper section then receives the telecommunication device while the other receives an electric supply device, such as a receptacle.

At new installations where the pedestal is fixedly mounted to the side of a building post or pillar, conductors can be extended from or brought to the pedestal utilizing direct burial type conductors, or raceways, metallic or non-metallic conduits which will enclose and protect the conductors.

The lower opening of the pedestal can receive multiple conduit raceways with provisions for installing additional conduits or conductors in the future and to readily service an existing installation.

The present pedestal can also be utilized to rebuild and repair deteriorating existing installations of raceway cables or boxes that do not have adequate protection from damages. The pedestal can be fitted over the top and properly secured and grounded in the conductors easily reconnected to their devices mounted in the upper pedestal opening.

According to the present invention, the pedestals provide protection of the installations from stresses because of the gradual soil erosion that always occurs around the adjoining foundation walls over time or other excavations when outdoor circuits are installed. Also in areas where freezing and thawing cycles are encountered, the open bottom portion of the pedestal allows cables or conduits to rise or fall without stress to the cables because they are not secured to the pedestal until and the conductors are trained with an "s" loop before terminating to the upper portion mounted device.

As noted above, the pedestals are provided with NEMA dimensions—(National Electrical Manufacturers Association) that will fit available power and communication devices, plus "wet location", and "in use wet location" protective covers. Cover plates provided with gaskets and threaded integral hubs can also be utilized to mount fixtures or photo cell controls without having to drill an additional mounting hole or holes.

Pedestals can be provided with an offset, according to one embodiment of the present invention, as needed to facilitate installing them under pavement grading, brick paving, or walkways so as to avoid interfering with the root ball of a tree, or other landscape type bush roots or shrub roots, while providing for a placement of a receptacle or lighting unit at the base of the tree, shrub, or bush, and be out of the way of foot traffic and not be a trip hazard.

The pedestals have a cross sectional area of 2½ inches by 5 inches and a height from 30 to 56 inches. They are constructed of painted steel or stainless steel, and there are removable covers provided on the front side as noted above to give adequate room for anchoring, cables, installation, and raceway placement. The device opening; i.e., the rectangular opening in the upper portion, receives two gang or single gang devices with vertical or horizontal openings. When the devices are mounted, or raceways are extended from the top, Meyer's Hubs, sealing locknuts, or sealing washers, are used. The pedestals are installed so that they extend 24 inches below grade level, and the top portions of the pedestals extend a minimum of 6 inches above grade. The longer pedestals are used to extend higher above grade level.

These pedestals, as disclosed, have already been improved by Underwriters Laboratories(UL).

Other objects and advantages of the present invention will appear more clearly from the following detailed description.

DETAILED DESCRIPTION OF THE PREFERRED EMBODIMENT

Viewing the drawings with particular reference to FIGS. 1 to 4, a pedestal 10 for outdoor residential and commercial circuits is illustrated and is seen to include a housing 11 having a rectangular cross sectional dimension of about 2½ inches by 5 inches and a length of 30 to 56 inches. The pedestal 10 also includes an elongated access U-shaped cover 12 that fits over an elongated access opening 13.

Figure 1:
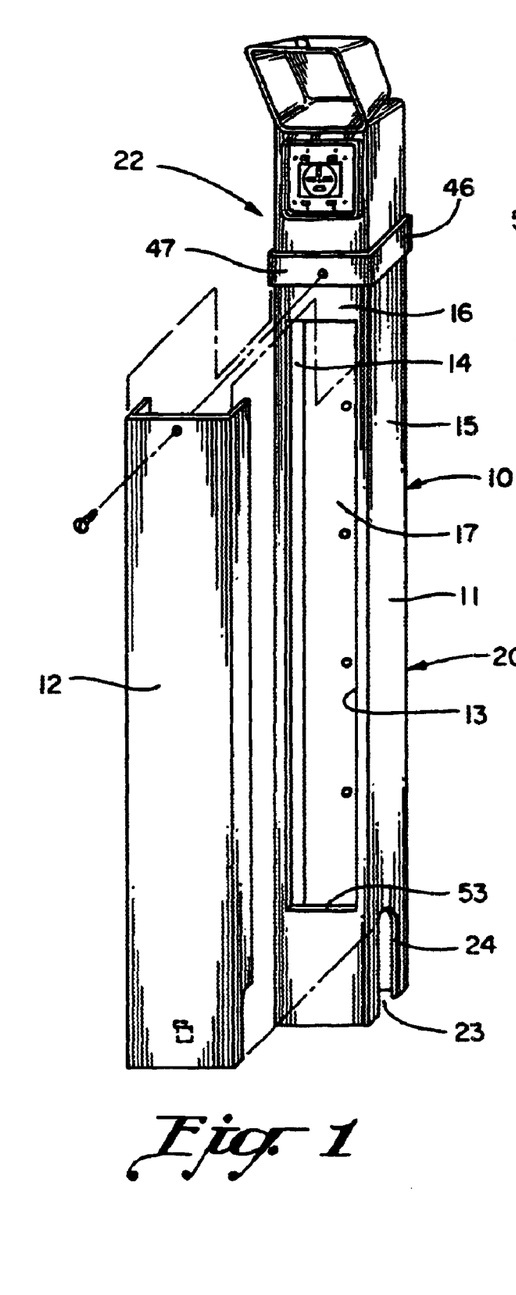
FIG. 1 is an exploded perspective of a pedestal according to the present invention with a receptacle mounted along with a bezel and pivotal cover, with the access cover exploded.
Figure 2:
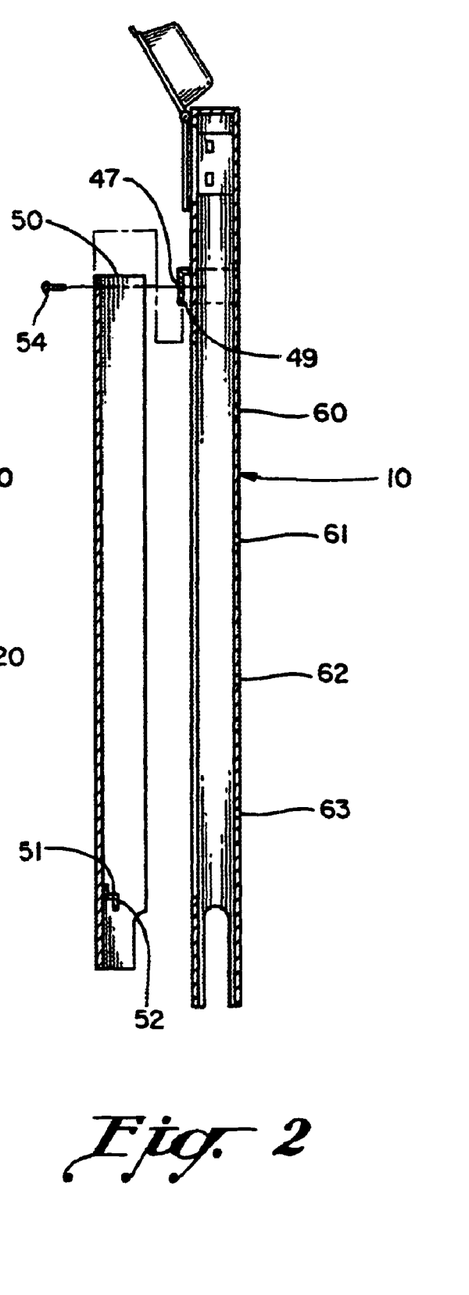
FIG. 2 is an exploded longitudinal side section of the pedestal illustrated in FIG. 1.

Housing 11 is seen to include side walls 14 and 15, front wall 16, and rear wall 17.

Figures 5, 6:
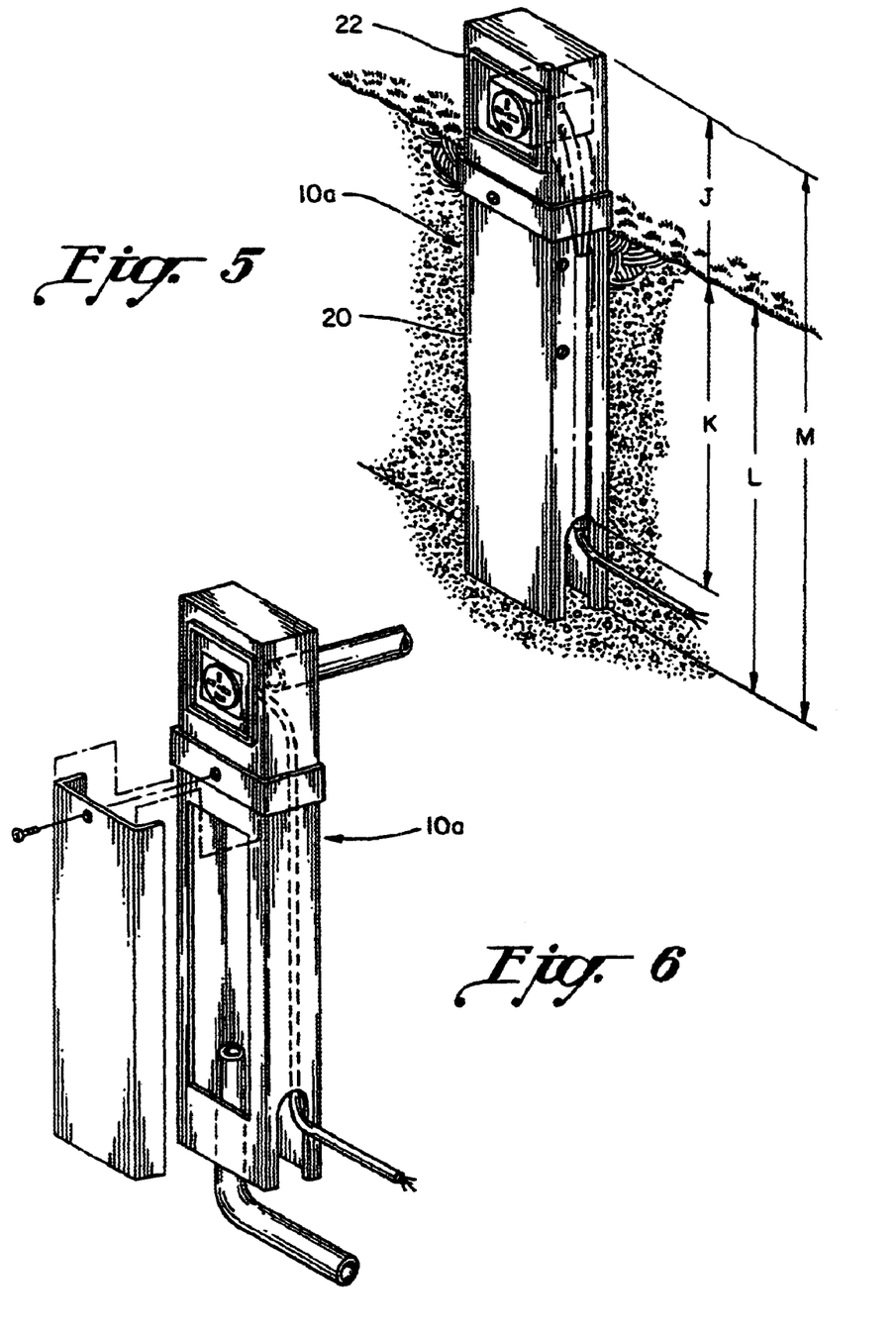
FIG. 5 is an inground installation of a shortened version of the pedestal illustrated in FIGS. 1 and 2 describing the mounting dimensions to grade.
FIG. 6 is an exploded perspective of the pedestal illustrated in FIG. 5 with the access cover exploded and a conduit entering the lower opening.

As seen in FIG. 5, the pedestal 10 is divided into a below grade portion 20 and an above grade portion 22. With dimension J being a minimum of 6 inches, K being 18 inches, L being 20 inches, and M being 30 inches, in the shortest 30 inch pedestal.

Lower portion 20 has an unrestricted opening 23 at its lower end which communicates with side slots 24 and both side walls 14 and 15 to prevent the unrestricted ingress and egress of conduit, raceways, cable, and other protected wiring.

Figure 3:
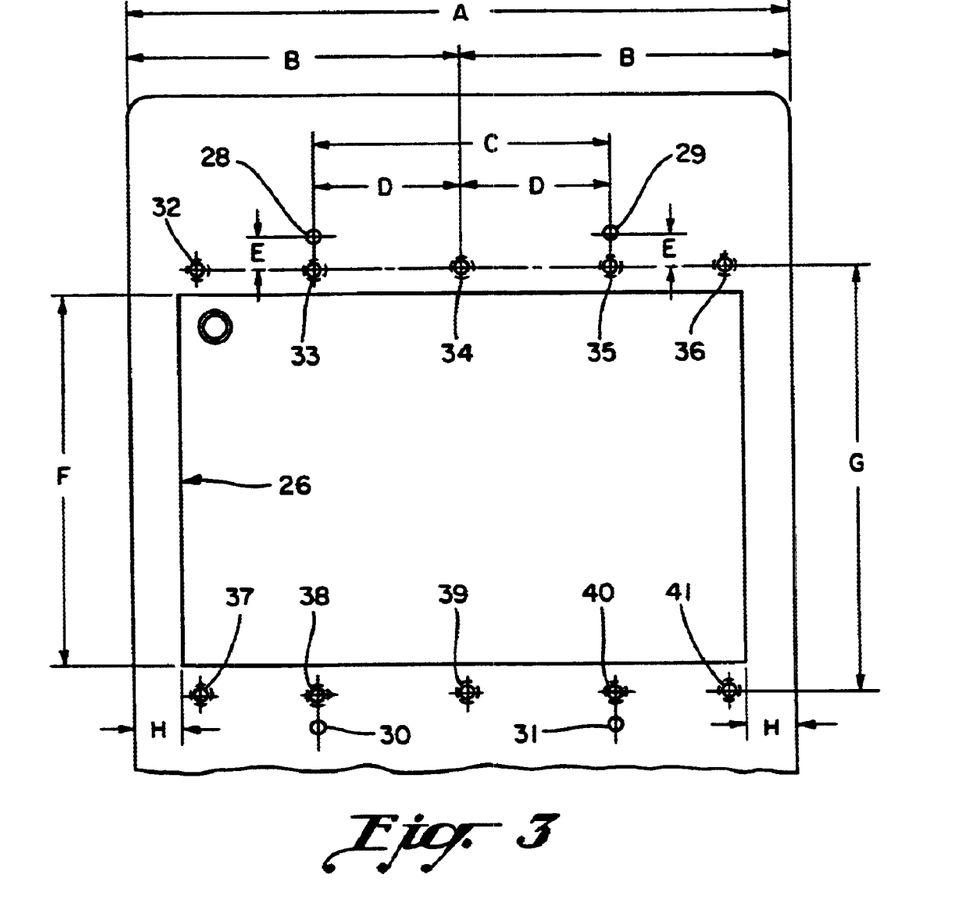
FIG. 3 is an enlarged fragmentary front view of the upper portion of the pedestal illustrated in FIGS. 1 and 2 with the receptacle, bezel, and cover removed.
Figure 4:
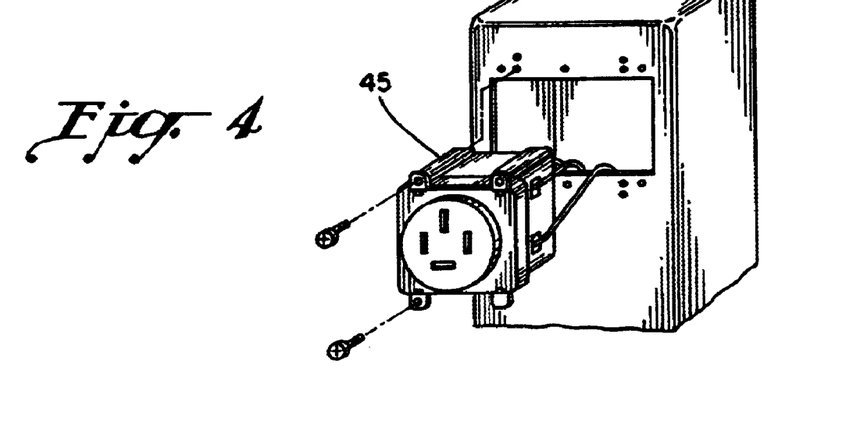
FIG. 4 is a partly enlarged exploded perspective of the top of the pedestal illustrated in FIGS. 1 and 2 with the receptacle exploded.

As seen in FIGS. 3 and 4, the front wall 16 of upper portion 22 has a rectangular opening 26, a vertical height of $2^{13}/_{16}$ th inches, and a horizontal width of 4¼ th inches.

As seen in FIG. 3, the area around the opening 26 has 14 NEMA dimensioned and sized untapped and tapped holes to provide mounting locations for single gang, double gang, and NEMA devices, as well as bezels, cover plates and covers therefor.

These include untapped $3/_{16}$ th holes, 28, 29, 30, and 31, and $6/_{32}$ nd tapped holes 32, 33, 34, 35, 36, 37, 38, 39, 40, and 41. The holes 32 to 41 are spaced from one another and the periphery of the housing 11 by the following dimensions:

A-5 inches
B-2½ inches
C-1$3/_{16}$ th inches
D-$29/_{32}$ nd inches
E-¼ th inch
F-$2^{13}/_{16}$ th inches
G-$2^{13}/_{16}$ th inches
H-⅜ th inches The mounting holes 32 to 41 provide very advanced and speedy mounting of a wide variety of single and double NEMA devices, as well as their covers without the installer utilizing drilling and tapping tools, particularly at the on site location, which is a difficult environment in which to provide accurate hole location.

FIG. 4 illustrates the installation of a single gang NEMA receptacle 45.

A 30 inch version of pedestal 10a is illustrated in FIGS. 5 and 6, shorter than the 56 inch version illustrated in FIGS. 1 and 2. However, in both the embodiments in FIGS. 1 and 2 and in 5 and 6, upper portion 22 includes a rain rib 46 welded to the outer periphery of the side walls 14 and 15, as well as front wall 16. The underside of rib 46 has a recess 49 that receives the upper portion 50 of the cover 12 preventing the entry of water and other foreign material into the interior of the housing 11. The interior of the cover near its lower end has an "S" shaped bracket 51 welded thereto that defines a lip 52 that fits over lower edge 53 of opening 13 to locate the cover 12 vertically on the housing 11. On the upper portion of the cover receives a fastener 54 for attachment to the housing upper portion.

Figure 7:
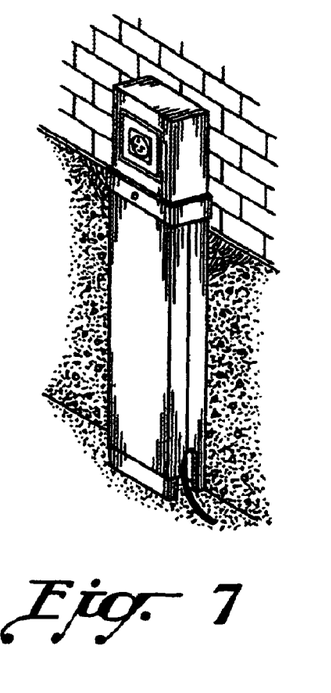
FIGS. 7, 8 and 9 are perspective views of various mounting alternative's.
Figure 8:
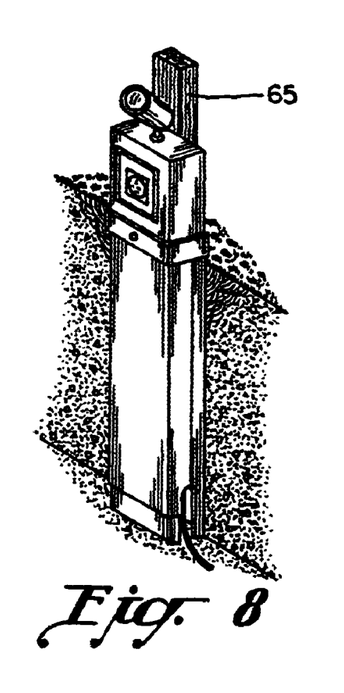
Figure 9:
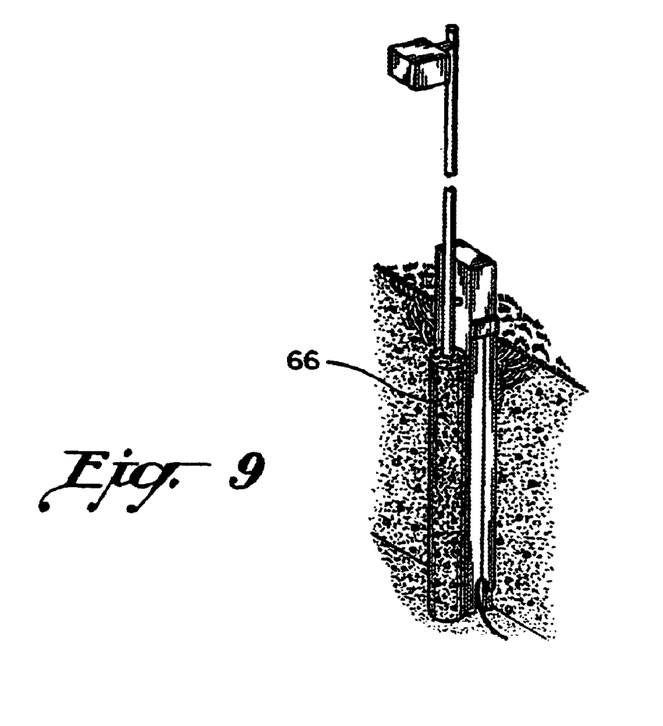

FIGS. 7, 8 and 9 illustrate typical installations for the present pedestal.

It should be understood that the pedestal is adapted to be mounted to a foundation or support post to maintain its stability, and toward this end, the rear wall 17 of the housing is provided with a plurality of apertures 60, 61, 62, 63 therein, adapted to receive fasteners for fastening the pedestal 10 to a supporting surface.

The supporting surface in FIG. 7 is a building wall constructed of concrete or brick; the supporting surface in FIG. 8 is post 65 driven deep into the ground, and the supporting surface in FIG. 9 is a light post assembly 66 embedded in the ground including a lower concrete portion.

Figure 10:
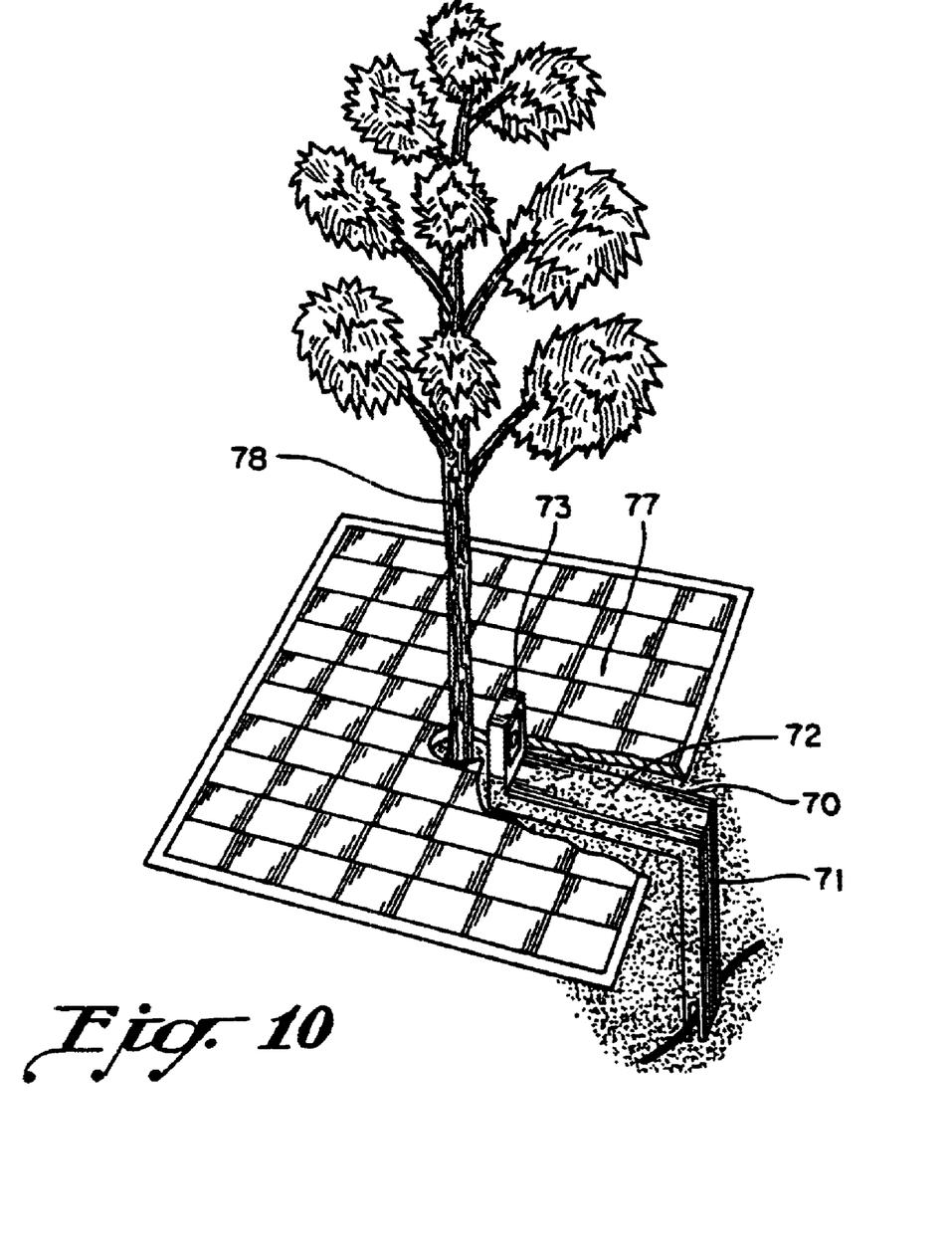
FIG. 10 is another embodiment of the present invention particularly suitable for offsetting the raceways from the receptacle for light around bricked areas.

FIG. 10 illustrates a "Z" shaped pedestal 70 having a vertical lower portion 71, a horizontal portion 72, and another above grade vertical portion 73 that has opening 26 therein as illustrated in FIGS. 3 and 4. Note that portion 72 extends under the grading 77 so that the vertical portion with the mounted devices, which could include a light, are near tree trunk 78.

Figure 11:
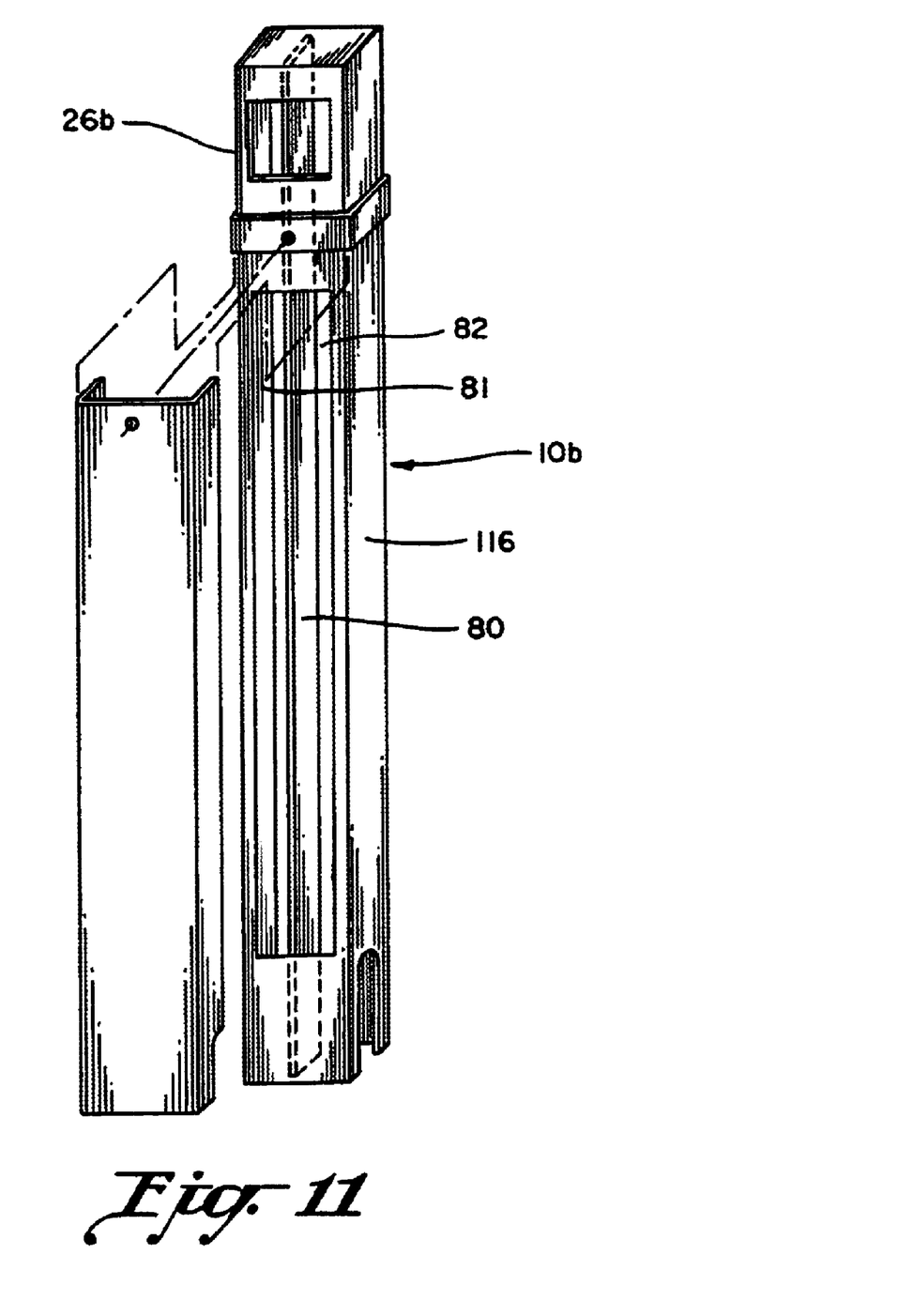
FIG. 11 is an exploded perspective of a pedestal similar to FIGS. 1 and 2 with the interior divided into power supply and telecommunications sections.

In FIG. 11, a pedestal lob is illustrated identical to pedestal 10 in FIGS. 1 and 2 except for a vertical central interior partition 80 that divides the interior of housing llb into two isolated sections 81 and 82. The partition 80 extends to the top of the pedestal across opening 26b and divides the opening 26b and the interior into these sections 81 and 82 so that one section can be isolated from the other and thus permits the use of telecommunications wiring and devices in one section and electrical power supply wiring and devices in the other section.

What is claimed is:

1. A pedestal for outdoor circuits, comprising: a vertically elongated metallic housing having a lower portion adapted to be mounted below grade and an upper portion adapted to project above grade, said lower portion having an unrestricted lower interior for freely receiving a plurality of conductors, said housing upper portion having a top portion including a rear wall, side walls integral with the rear wall and a front wall integral with the side walls, said top portion front wall having a generally rectangular opening therein about 2¹³⁄₁₆ inches by 4¼ inches adapted to receive selectively a plurality of electrical devices, said top portion front wall having a plurality of holes therein surrounding the rectangular opening spaced to conform to standardized mounting dimensions of said electrical devices, said housing having an unrestricted interior therein from the lower portion to the rectangular opening adapted to receive the conductors, and an elongated access cover over the upper portion of the housing that fits entirely below the top portion of the housing upper portion.

2. A pedestal for outdoor circuits as defined in claim 1, wherein the holes in the top portion front wall around the rectangular opening are spaced according to standard NEMA dimensions.

3. A pedestal for outdoor circuits as defined in claim 1, wherein the access cover is vertically elongated.

4. A pedestal for outdoor circuits as defined in claim 1, wherein the housing upper portion below the top portion has a rear wall, and a plurality of fastening devices in the rear wall for attaching the housing to a foundation or other fixed abutment.

5. A pedestal for outdoor circuits as defined in claim 1, wherein the housing has a cross section approximately 2½ inches by 5 inches and a generally vertical length between 30 inches to 54 inches.

6. A pedestal for outdoor circuits as defined in claim 1, wherein the housing upper portion has a horizontally extending portion to extend around gratings.

7. A pedestal for outdoor circuits as defined in claim 1, wherein the housing has a peripheral rain rib around a lower part of the top portion with a lower recess therein, said access cover adapted to fit in the rain rib recess.

8. A pedestal for outdoor circuits as defined in claim 1, said housing having a vertical divider therein for separating the housing interior into an outdoor power supply section and a telecommunications sections.

9. A pedestal for outdoor circuits, comprising: a vertically elongated metallic housing having a lower portion adapted to be mounted below grade and an upper portion adapted to project above grade, said lower portion having an unrestricted lower interior for freely receiving a plurality of conductors, said housing upper portion having a top portion including a rear wall, side walls integral with the rear wall and a front wall integral with the side walls, said top portion front wall having a generally rectangular opening therein adapted to receive selectively a plurality of electrical devices, said top portion front wall having a plurality of holes therein surrounding the rectangular opening spaced to conform to NEMA standardized mounting dimensions of said electrical devices, said housing having an unrestricted interior therein from the lower portion opening to the rectangular opening adapted to receive the conductors, said rectangular opening having a size of about 2¹³⁄₁₆ inches by 4¼ inches, and an elongated access cover over the upper portion of the housing that fits entirely below the top portion of the housing upper portion.

10. A pedestal for outdoor circuits, comprising: a vertically elongated metallic housing having a lower portion adapted to be mounted below grade and an upper portion adapted to project above grade, said lower portion having an unrestricted lower interior for freely receiving a plurality of conductors, said housing having a top portion including a rear wall, side walls integral with the rear wall and a font wall integral with the side walls, said top portion front wall having a generally rectangular opening therein about 2¹³⁄₁₆ inches by 4¼ inches adapted to receive selectively a plurality of electrical devices, said top portion front wall having a plurality of holes therein surrounding the rectangular opening spaced to conform to NEMA standardized mounting dimensions of said electrical devices, said housing lower portion having an unrestricted interior therein from the lower, portion to the rectangular opening adapted to receive the conductors, said housing has a cross section approximately 2½ inches by 5 inches and a generally vertical length between 30 inches to 54 inches.

11. A pedestal for outdoor circuits as defined in claim 9, wherein the housing upper portion below the top portion has a rear wall, and a plurality of fastening devices in the upper portion rear wall for attaching the housing to a foundation or other fixed abutment.

12. A pedestal for outdoor circuits as defined in claim 9, wherein the housing top portion has a peripheral rain rib at its lower end with a bottom recess therein, and said access adapted to fit in the rain rib recess.

* * * * *